Figure 1:
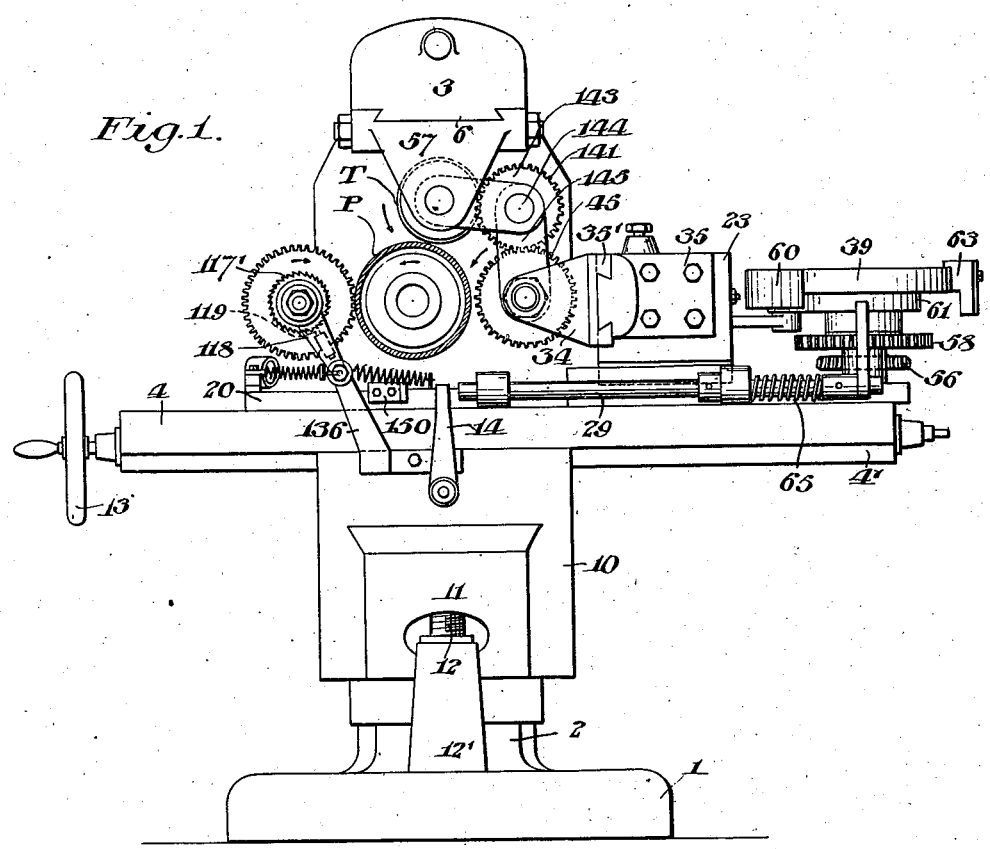

Dec. 14, 1926.  
G. E. MIRFIELD  
1,611,123  
METHOD OF AND MACHINE FOR MILLING THREADS  
Original Filed Jan. 11, 1924    5 Sheets-Sheet 1

Inventor:  
George E. Mirfield,

Dec. 14, 1926.  1,611,123
G. E. MIRFIELD
METHOD OF AND MACHINE FOR MILLING THREADS
Original Filed Jan. 11, 1924   5 Sheets-Sheet 2
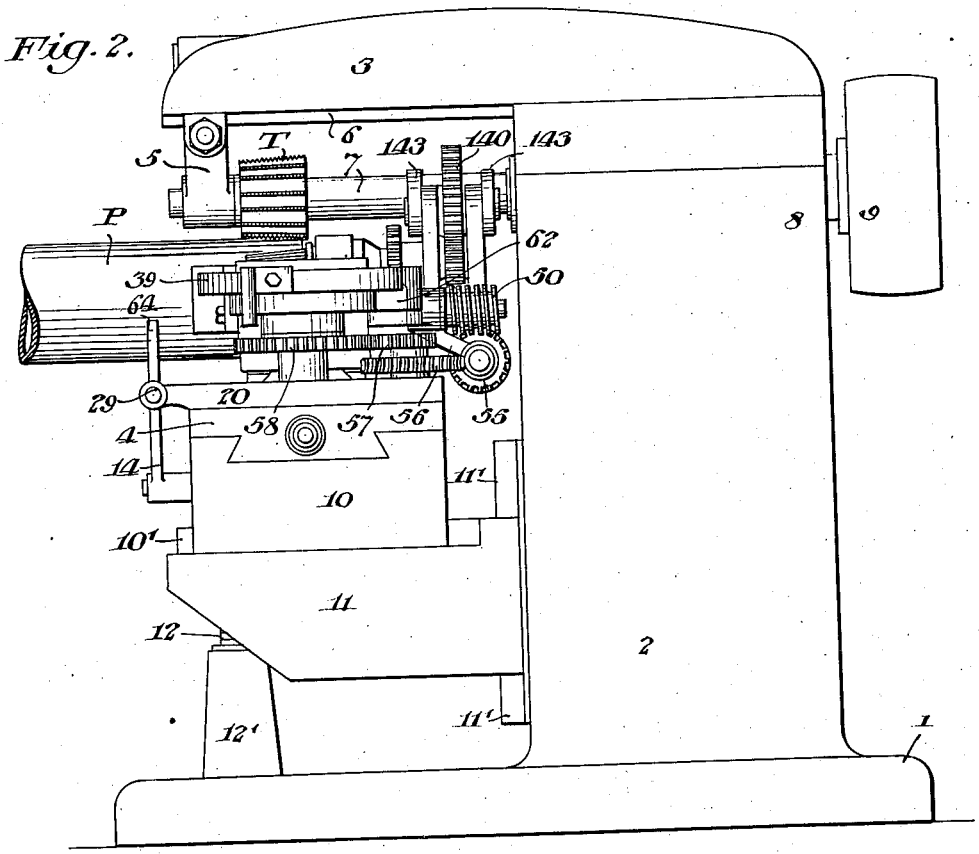
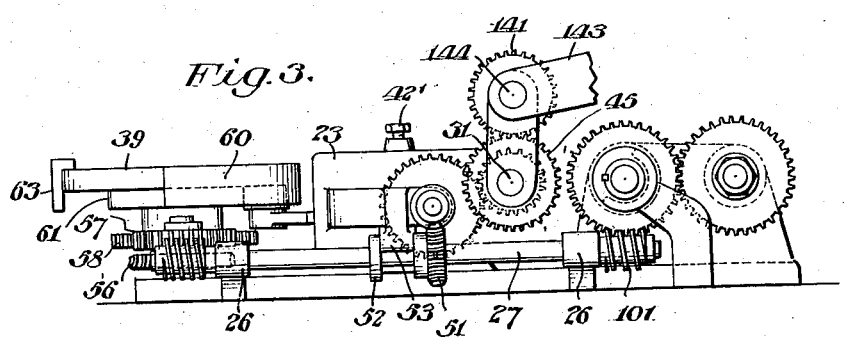
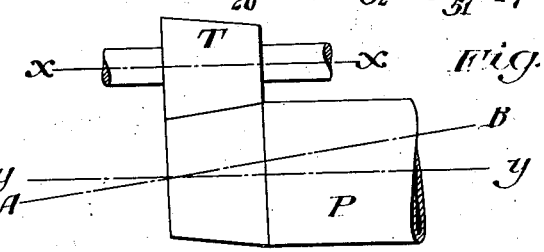
Inventor:
George E. Mirfield,
By Attorneys.

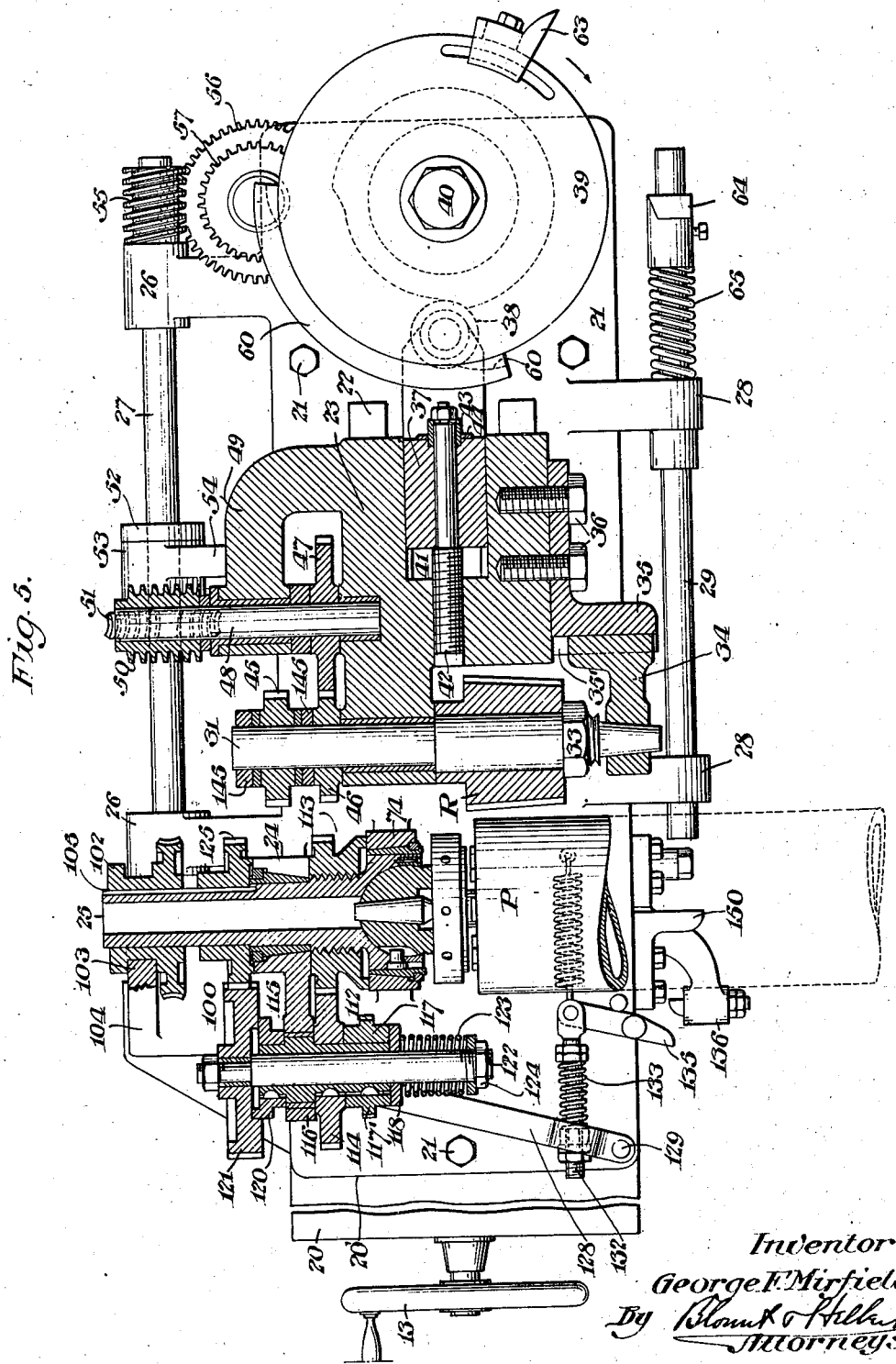

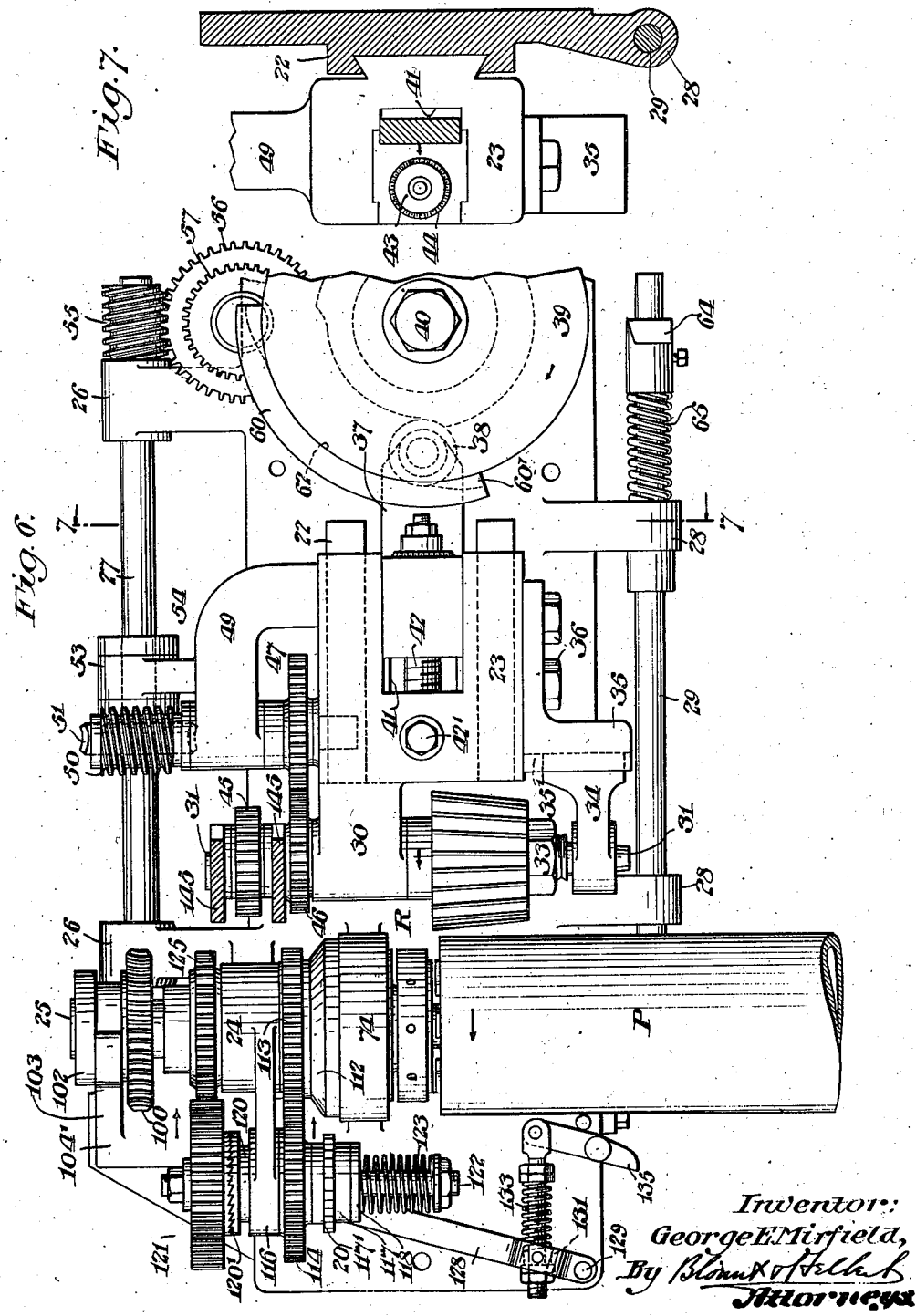

Dec. 14, 1926.  
G. E. MIRFIELD  
1,611,123  
METHOD OF AND MACHINE FOR MILLING THREADS  
Original Filed Jan. 11, 1924   5 Sheets-Sheet 5
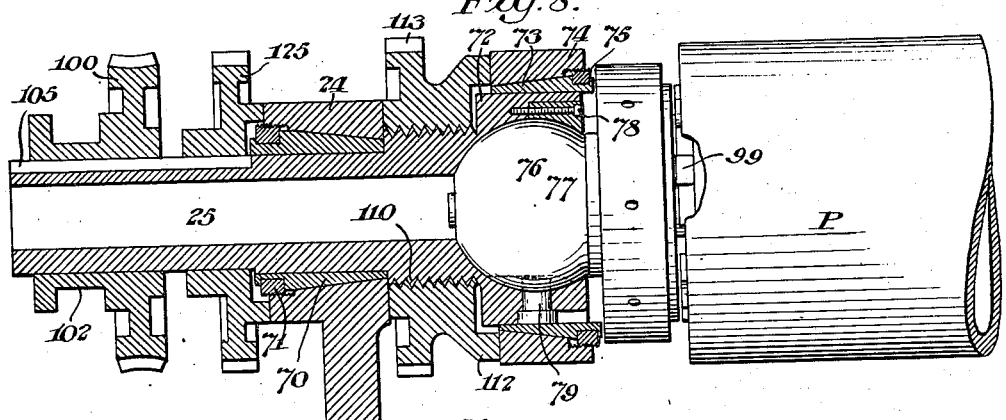
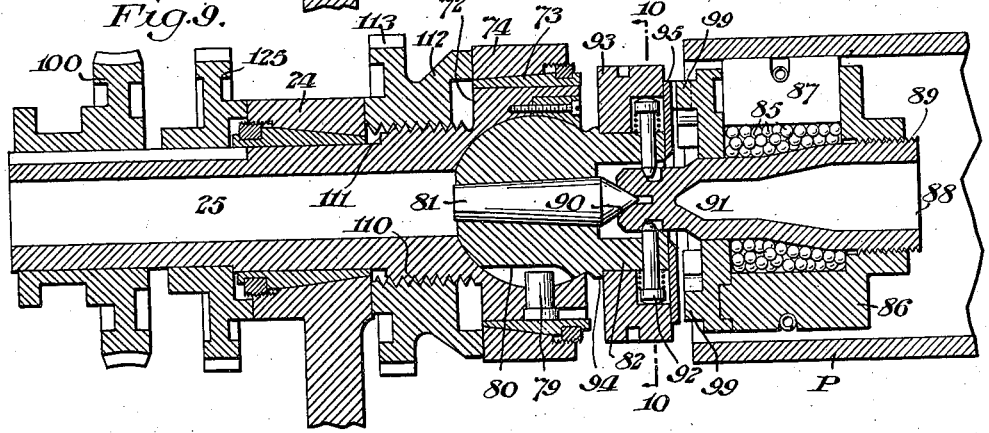
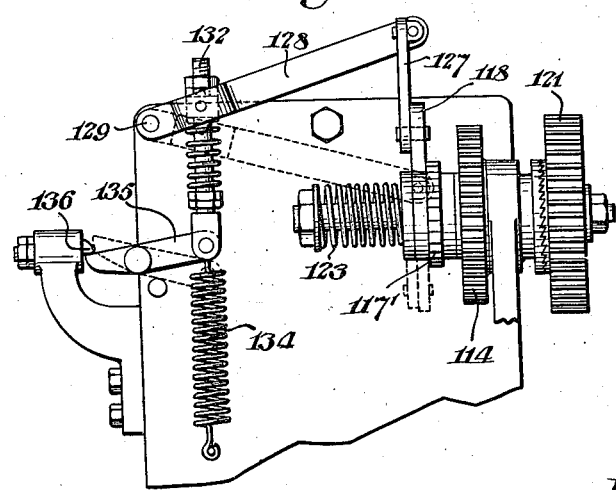
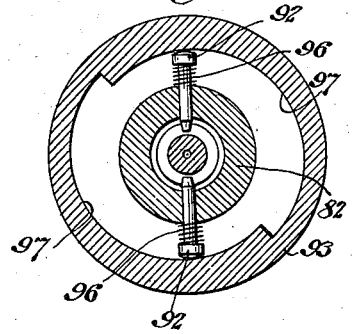
Inventor:  
George E. Mirfield,  
By *[signature]*  
Attorneys.

Patented Dec. 14, 1926.

1,611,123

UNITED STATES PATENT OFFICE.

GEORGE E. MIRFIELD, OF YOUNGSTOWN, OHIO.

METHOD OF AND MACHINE FOR MILLING THREADS.

Original application filed January 11, 1924, Serial No. 685,545. Divided and this application filed November 26, 1924. Serial No. 752,289.

This application is a division of an application for U. S. Letters Patent, Serial No. 685,545, filed by me January 11, 1924, and entitled Improvements in method of and machine for milling threads.

In the said application I fully disclosed an improved method of milling threads as well as one form of machine suitable for its accomplishment, said machine embodying, among other things, a work-holding spindle and means for causing longitudinal progression and retraction of the spindle with respect to the cutter of the machine in accordance with a novel method of operation, and said means and method are claimed herein.

Thus the present invention is more particularly directed to the provision of a novel method of effecting longitudinal progression and retraction of the work-holding spindle of a machine, such, for example, as the thread milling machine disclosed in my said application Serial No. 685,545 and, additionally, the provision of novel means for the accomplishment of said method. Further objects, features and characteristics comprehended by the invention will hereinafter more fully appear.

As the present invention particularly lends itself to employment in a machine of the general character of that disclosed in my said application Serial No. 685,545, I have illustrated in the accompanying drawings and will herein describe such a machine embodying a work-holding spindle in association and combination with means for effecting longitudinal progression and retraction thereof in accordance with one manner of performing the present invention and operating in conformity with my improved method, it being understood however that the use of the present invention is by no means confined to the specific machine hereinafter disclosed as the invention readily lends itself to and is suitable for use in other machines as will be apparent to those familiar with the art.

In the aforesaid machine there are employed a pair of rotatable milling cutters respectively of suitable character to impart to the work a roughing cut of sufficient depth to remove the scale and true the surface which is to be threaded and to form the desired threads thereon, these cutters being so arranged in their relation to each other and to the work that the roughing cutter operates on the rotating work at a point in advance of that at which the threading cutter operates thereon. Moreover for the production of a tapered thread the cutters are tapered longitudinally with respect to their axes of rotation in conformity with the taper of the thread which it is desired to produce and are of substantially the length of such thread and the threading cutter is provided with a plurality of annular teeth having the profile of the form of the desired thread but without pitch, so that by effecting substantially a single revolution of the work with respect to that cutter and simultaneously moving the work longitudinally for a distance substantially equal to the pitch of the thread to be cut while effecting slight relative movement between the work and the cutter in a direction substantially normal to the axis of the latter, a complete, tapered, accurate spiral thread of the desired length will be formed in the work.

Moreover, as more fully disclosed in my said application, the machine comprises, in operative association and combination with means and instrumentalities to render it suitable for the performance of my improved method of milling threads as claimed in my said application, Serial No. 685,545 and for effecting the longitudinal progression and retraction of the work-holding spindle in accordance with the novel method claimed in this application, a suitable milling machine such as may be readily purchased in the open market and embodying a removable bed or table with means for vertical and transverse adjustment thereof and an automatic longitudinal feed for the table and a quick return feed therefor, the machine also having an overhanging arm arranged to provide a bearing for the outer end of the cutter arbor as will hereinafter more fully appear.

Figure 4:
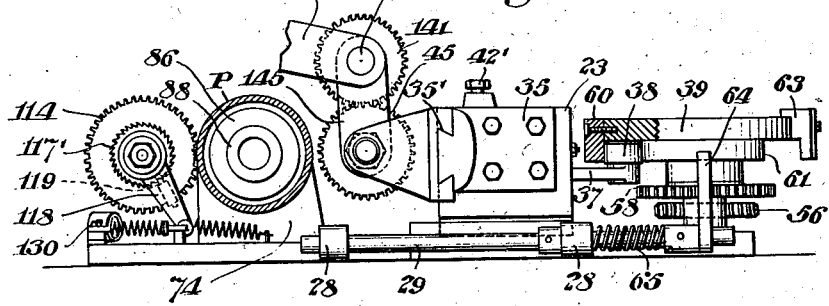

In the accompanying drawings Fig. 1 is an end view of the organized machine in its preferred embodiment, the same being shown with the parts in initial or starting position as at the commencement of the threading operation on the work which is also shown, and Fig. 2 is a rear view of the machine shown in Fig. 1. Fig. 3 is a somewhat enlarged side elevation of certain of the mechanism removed from the machine table, and Fig. 4 is a similar view of the opposite side thereof, the parts being shown in the same position as in Fig. 1 and broken away into vertical section at certain points to better illustrate internal construction. Fig. 5 is a further enlarged top plan view with certain parts in horizontal section of certain of the mechanism in operative position on the machine table; Fig. 6 is a similar, partially fragmentary view thereof but removed from the table and with all parts shown in plan; Fig. 7 is a fragmentary vertical section on line 7—7 in Fig. 6; Fig. 8 is a further enlarged fragmentary view partially in section and partially in elevation of the main spindle and adjacent parts in one position; Fig. 9 is a similar view, but wholly in central section, of the same parts in a different position and additionally illustrating the internal construction of a preferred form of chuck which may be employed when the work to be threaded is a pipe or other hollow object, while Fig. 10 is a transverse section on line 10—10 in Fig. 9. Fig. 11 is a fragmentary plan view illustrating the operation of certain of the mechanism employed to effect the return of the main spindle to initial position after the completion of the threading cycle, and Fig. 12 is a diagrammatic view illustrating on an exaggerated scale the relative angular disposition of the axis of rotation of the threading cutter and the axis of the main spindle when the machine is intended for the production of tapered threads. Similar symbols are used to designate the same parts in the several figures.

At this point it will be of advantage to briefly refer to the sequence of steps and the relative positions assumed by the cutters and the work during the series of operations performed in the threading of a piece of work or during the "threading cycle" as it may conveniently be termed, as by so doing a more ready and adequate comprehension of the construction of the various parts of the machine and their method of operation as hereinafter described will be attained.

Assuming that a taper thread is to be formed upon one end of a pipe P, the end of the pipe to be threaded is first chucked, centered and clamped to the main spindle of the machine so as to move in correspondence therewith. Above this spindle but out of vertical alignment therewith the threading cutter T is supported on the main arbor of the machine so as to be driven thereby, while adjacent but out of contact with the pipe, below the threading cutter and also out of vertical alignment therewith, is disposed the roughing cutter R. Preferably both of these cutters are similarly tapered longitudinally and in the same direction in correspondence with the taper of the thread which it is desired to form, and while the threading cutter is provided with a plurality of annular form teeth without pitch, as hitherto described, the roughing cutter is provided with longitudinally extending teeth of any suitable form for effecting a roughing cut on the pipe to remove the scale therefrom and bring the pipe to truly circular cross section. The parts being disposed in the manner aforesaid, the pipe and both cutters are caused to rotate, preferably all in the same direction, the pipe at relatively slow speed and the cutters at relatively high speed, and the roughing cutter is moved horizontally toward the pipe for a sufficient distance to cause it to enter the pipe for the requisite depth to produce the desired roughing cut and thereafter maintained in that position until it has traversed the entire surface which is to be threaded. As the pipe continues to turn with respect to this cutter, the point where the cutter first entered the pipe, or in other words, the point where the roughing cut initially commenced, gradually moves around and upward toward the threading cutter and simultaneously with this movement both the pipe and the roughing cutter, while maintaining their relative position, are gradually moved horizontally in a direction to cause the pipe to approach the threading cutter in a generally tangential, as distinguished from a radial, direction until the cutter enters the pipe to a depth requisite to form the threads, which will ordinarily be accomplished when the pipe and cutter are in substantial vertical axial alignment. When this point is reached, further movement of translation of the pipe and roughing cutter is arrested and thereafter the threading cutter and the pipe remain in the same relative position until that portion of the pipe which is to be threaded has been completely subjected to the action of that cutter, thus completing the threading cycle. Moreover, during the operation of the threading cutter on the pipe, the latter is given a longitudinal movement with respect thereto at a predetermined rate of progression and is also given a gradual and very slight movement in a direction substantially transverse to the axis of rotation of the cutter to effect the necessary compensation for the difference in radial magnitude of different points on the tapered thread which is in process of formation, these several combined movements and different steps and operations resulting in the production on the pipe of a continuous spiral tapered thread of a form similar to the profile of the teeth on the threading cutter.

Referring now to the machine shown in the drawings, the same comprises a base 1 from which rises a pedestal 2 to the upper extremity of which is rigidly secured an overhanging arm 3 the free end of which extends over the movable table or bed 4. This arm is provided with a depending bracket 5, slidable on ways 6 on the under side of the arm, in the lower end of which is journaled the outer end of the arbor 7 which, through suitable mechanism (not shown) is arranged to be driven from the main shaft 8 which may be provided with a pulley 9 for the reception of a belt extending to the source of power employed. If desired, however, the machine may be supplied with a motor drive or other means for effecting rotation of the shaft 8. The bed 4 which is provided with ways 4' on its under side, is longitudinally slidable in a block 10 in a direction at right angles to the axis of the arbor 7 while the block is transversely adjustable, that is, in a direction parallel to said axis on ways 10' formed on a supporting bracket 11 which in turn is carried by and vertically adjustable on ways 11' disposed on the face of the pedestal 2 and which may also be supported adjacent its opposite or outer end on a threaded vertically adjustable column 12 carried in a housing 12' rising from the base. It will be understood that the machine is provided with suitable means (not shown) for effecting vertical adjustment of the bracket 11 and cross adjustment of the block 10 in the manner common to milling machines so that the bed may be moved both vertically and longitudinally with respect to the arbor 7 in the initial setting of the machine. Additionally, the bed itself is provided with means for reciprocating it beneath the arbor, said means preferably comprising an automatic feed for moving the bed rearwardly or to the right when viewed as in Fig. 1 and a quick return feed, conveniently manually operated, for moving it forwardly or to the left when viewed as in said figure, this latter means being operable through the hand wheel 13 in the ordinary manner. For throwing the automatic feed in or out, the machine may also be provided with a trip 14 which, when moved to the left from the position shown in Fig. 1, is effective to engage the feed mechanism so as to move the bed rearwardly and which, when thrown in the opposite direction from the position which it assumes when the feed is so engaged, is effective to throw out the feed and thereby arrest the rearward movement of the table. As the different features to which reference has hitherto been briefly made are generally embodied in ordinary milling machines and, together with the mechanism employed for accomplishing them, are well known and understood, further description thereof is unnecessary to an adequate comprehension of the present invention.

Upon the table 4 of the machine I dispose mechanism in the nature of a fixture or attachment which more particularly may comprise a base 20 held down by bolts 21 or in any other suitable way. This base is of substantially elongated rectangular form and more or less adjacent its center is provided with undercut ways 22 extending generally parallel to the side edges of the base and in which is slidably mounted the roughing cutter supporting block 23 hereinafter described. In front of the block, that is, more nearly adjacent the front edge 20' of the base, the latter is provided with a vertically extending housing 24 in which is journaled the main spindle 25, while projecting from the side of the base most nearly adjacent the pedestal 2 when the base is on the table are longitudinally separated brackets 26 forming supports for the drive shaft 27 which is rotatably journaled therein and extends generally parallel to the base, while on its opposite side the base may be provided with longitudinally spaced brackets 28 through which is slidably extended the feed trip rod 29 hereinafter more particularly described.

For supporting the roughing cutter R the roughing cutter supporting block 23 is provided with a forwardly extending bracket 30 which may be integral with the block and in which is journaled the roughing cutter shaft 31 on which is removably clamped the roughing cutter in any suitable way, conveniently by a clamping nut 33. In order to prevent any springing or whipping of the shaft the outer or overhanging end is journaled in a support 34 carried by a bracket 35 bolted or otherwise secured to the roughing cutter supporting block as by bolts 36. In order to permit the ready removal of the support 34 when the cutter is being changed, I may provide the bracket with ways 35' over which the support is adapted to engage so that the latter may be readily slipped off of the bracket when it is desired to clear the end of the shaft and as readily returned to position thereon. It will thus be observed that under operative conditions the roughing cutter shaft is securely supported on both sides of the cutter and the latter thereby constrained to run truly under all conditions.

The roughing cutter supporting block is also provided with a rearwardly extending tongue 37 at the extremity of which is mounted a cam roller 38 adapted for cooperation with a horizontally disposed cam 39 rotatably mounted on a vertically extending pivot 40 carried by the rear end of the bed. To enable adjustment of the block toward or away from the cam I prefer to arrange the tongue to slidably extend into a slot 41 in the block and to provide for its longitudinal adjustment in this slot by means of an adjusting screw 42 which extends through the tongue and has its forward end threaded into the block. The rear end of this screw projects through the tongue and is provided with an adjusting collar 43 carrying an indexing dial 44, the parts being arranged in such manner that by turning the collar the screw may be screwed in or out in the block with corresponding movement of the tongue with respect thereto, a set screw 42' extending downwardly through the block to contact with the screw 42 being employed to lock the latter in any desired position of adjustment. This capacity for relative adjustment between the tongue and the block is of utility in regulating the depth of the roughing cut as will hereinafter appear.

The drive of the roughing cutter is effected, as hereinafter more fully described, through the medium of a gear 45 mounted on the roughing cutter shaft which also carries another gear 46 meshing with still another gear 47 carried by a stub shaft 48 journaled in the block and extending through an arm 49 projecting from the side thereof. On the outer end of this shaft is mounted a worm 50 meshing with a worm gear 51 splined upon the main shaft 27 so as to be capable of sliding movement thereon but constrained to rotate therewith. As during the operation of the machine the roughing cutter supporting block is moved back and forth in the ways 22, it is necessary in order to maintain constant and proper engagement between the worm 50 and gear 51 to provide means for moving the latter on the shaft in correspondence with the movements of the block, a result which can be conveniently accomplished by securing the gear to one end of a flanged sleeve 52 which is engaged by a fork 53 disposed at the end of a short overhanging arm 54 extending from the arm 49 in such manner that while the sleeve can rotate in the fork in correspondence with the rotation of the drive shaft, any movement of the roughing cutter block in a direction parallel to the shaft will effect a corresponding sliding movement of the sleeve and gear thereon. Thus, irrespective of the position of the block, the worm 50 and gear 51 are constantly maintained in proper meshing engagement and the gear constrained to rotate with the shaft and actuate the worm. The means employed for driving the gear 45 are hereafter more fully described.

Roughing cutter translating means.

The main shaft is also employed for effecting rotation of the cam 39 which, among other things, is operative to advance and retract the roughing cutter block through the medium of the tongue 37, and to this end the shaft 27 is provided near its rearmost extremity with a worm 55 disposed in meshing engagement with a horizontally positioned worm gear 56 carried by a short stud rotatably supported on the base 20. Above this gear and on the same stud is mounted thereon another gear 57 arranged to mesh with still another gear 58 secured to the hub 59 of the cam 39, the several parts being arranged in such manner that rotation of the drive shaft will be effective to rotate the cam but at a materially lower speed. The principal function of the cam is to advance the roughing cutter supporting block and the roughing cutter toward the work at the proper time in the cycle of operations, to hold the block in such position while the roughing cutter is operating on the work, and to retract the block to initial position after the roughing cutter has completed its operation on the work, and the cam may therefore be of any construction suitable for accomplishing these results. In the particular embodiment shown the cam comprises a circular horizontally disposed plate to the rim of which is bolted a short depending segment 60 cut away on its inner face as at 60' to the desired contour and a hub 61 of suitable contour arranged beneath the plate in the plane of the depending portion of the segment, thus providing a cam groove 62 between the segment and the hub of suitable width to accommodate the cam roll 38. When the cam is so constructed the hub is operative during the rotation of the cam to move the roll forwardly at the proper time and to hold it in advanced position for the required period, and the segment is operative to thereafter retract the roll and hold it in retracted position; it is therefore unnecessary to provide a continuous closed cam groove either by extending the segment entirely around the plate or by routing out a groove in the under surface thereof.

The cam is also provided with a dog 63 which projects beyond its periphery and is conveniently adjustable with respect to the cam for a limited distance. This dog is of such form that at the proper point in the rotation of the cam it will contact with the preferably beveled end of a vertically projecting finger 64 adjustably mounted upon and near the end of the trip rod 29 to extend in the path of the dog, so as to urge the rod forward against the resistance of the spring 65 disposed about the rod and cause it to engage the free end of the trip 14 thereby forcing the trip to a position to throw in the automatic feed for the table or bed 4, the conformation of the contacting surfaces of the dog and of the finger being such that after this result is accomplished the dog, as the cam continues its rotation, will slide free of the end of the finger.

Main spindle.

In operation the requisite rotation of the pipe or other work is effected from the preferably hollow main spindle 25 to which the pipe is suitably centered and clamped and the construction of the spindle and certain adjacent mechanism will now be described. The spindle itself is disposed above the base 20 and generally transversely thereof between the forward edge 20' of the base and the roughing cutter and is journaled for rotation in the housing 24 preferably through the medium of an adjustable tapered split collet bushing 70 whose position is controlled by an adjusting ring 71 in the usual manner so that accurate adjustment of the bushing may be made when required to compensate for wear. At its inner end the spindle may be provided with an enlarged integral annular head 72 which is in turn supported for rotation in a similar adjustable bushing 73 controlled by an adjusting ring 75 and disposed in a housing 74 integral with and rising from the base. The interior of the head is cupped out to generally spherical contour to receive a centering ball 76 which is retained in position in the head by a collar 77 having a spherical inner surface and removably secured in a depresion in the forward side of the head by screws 78, the arrangement being such that the centering ball is very snugly seated in the end of the spindle but is capable of limited universal movement with respect thereto. To constrain the ball to rotate with the spindle a stud 79 is extended through the head to project into a slot 80 formed in the ball while removably disposed in a tapered bore in the center of the ball and projecting therefrom is a center 81 which may be of ordinary construction. The ball is also provided with an annular preferably integral flange 82 which projects therefrom in a direction away from the head 72 and surrounds the centering point of the center 81. This flange forms a component part of the means employed for operatively securing the pipe to the spindle and will now be described.

*Pipe chucking, centering and driving means.*

While for the purpose of chucking the pipe any suitable means may be utilized, I prefer to employ a chuck of the general character of that disclosed in my pending application for Letters Patent of the United States Serial No. 439,959, filed January 26, 1921, now Patent No. 1,548,730, issued August 4, 1925, and entitled Improvement in method and apparatus for milling threads, since a chuck of that character is adapted to securely grip the pipe without distorting it, a condition essential to the production of accurate threads as if the pipe is sprung or distorted by the chuck or other holding means employed and the threads formed upon it while so distorted, the pipe will to some extent resume its original form after the grip of the chuck is released, so that although the threaded area may have presented a truly circular cross section after the threads have been formed but before the release of the chuck, it thereafter presents a more or less elliptical cross section.

I have therefore illustrated and, as stated, prefer to employ a chuck of the general character of that disclosed in my said patent, designed for disposition in the interior of the end of the pipe, and which may comprise a plurality of balls 85 disposed in a generally cylindrical carrier 86 and operative to force radially outward against the pipe wall a plurality of blades 87 when a central generally conical member 88 is moved into the carrier in a direction to force the balls outwardly away from the center. As shown, this member has at its larger end a threaded region 89 extending through a correspondingly internally threaded bore in the carrier; thus, by grasping the nose or smaller end of the member which projects beyond the opposite end of the carrier with a suitable wrench and rotating the member in the proper direction, the balls may be crowded together so as to force the blades outwardly to engage the pipe with equal pressure at a plurality of spaced points, thereby securely clamping the chuck in the interior of the pipe without any distortion of the latter. As the chuck forms no part of the present invention save as it is utilized for the purpose of holding the pipe in the threading operation, further description thereof herein is unnecessary.

When using a chuck of this general character in my improved machine I provide the nose of the member 88 with a central depression 90 adapted to receive the point of the center 81 as well as an annular groove 91 extending around the nose and the side of which adjacent the end of the nose may be suitably inclined. This groove is adapted to receive the correspondingly beveled ends of a pair of spring pressed pins 92 extending inwardly at diametrically opposed points through the annular flange 82 and surrounded by a rotatable collar 93 disposed thereabout between a shoulder 94 on the flange and a covering plate 95 secured to the outer extremity thereof (see Fig. 9). The interior of the collar is hollowed out to form a recess for the reception of the heads of the pins and their actuating springs 96 which are arranged to constantly urge the pins outwardly and is provided with oppositely disposed similar cam surfaces 97 of suitable contour to move the pins simultaneously inwardly against the resistance of the springs when the collar is rotated. Thus, by rotating the collar in one direction the pins can be caused to withdraw from the space within the flange 82 to permit the nose of the member 88 to be entered therein, the chuck of course having been previously seated in and clamped to the pipe, after which by rotating the collar in the other direction, the pins may be caused to progressively enter the groove 91 and by coaction with the beveled sides thereof to draw the nose of the member 88 against the point of the center 81 and firmly clamp it thereto, thus accurately centering the chuck and in turn the pipe and locking it in such centered position, and for effecting rotation of the pipe in correspondence with the rotation of the spindle, the cover plate 95 is provided with an outwardly projecting dog 98 adapted to enter between any two of a plurality of spaced lugs 99 with which the end of the carrier is provided.

Main spindle actuating means.

The rotation of the main spindle 25 is effected through the medium of a worm gear 100 disposed in meshing engagement with a worm 101 on the forward end of the main drive shaft 27. This gear is provided with an integral hub 102 having a peripheral groove for reception of a fork 103 formed at the end of a bracket 104 integral with the base, and is splined to the spindle by a key or spline 105 so as to rotate therewith while permitting the spindle to slide longitudinally through the gear. Thus, irrespective of any longitudinal movement of the spindle, the gear by reason of its being supported from the fork is constantly maintained in mesh with the worm and adapted to rotate the spindle in correspondence with the rotation of the drive shaft.

During the threading cycle as hitherto stated, the spindle and in turn the pipe is moved longitudinally for a sufficient distance to produce a thread of the desired pitch upon the pipe and for effecting this result I employ novel means now to be described.

Hitherto in threading machines embodying provision for effecting longitudinal movement of the work with respect to the cutter with a view to producing a spiral thread or for other purposes, it has been customary to provide the spindle or other element to be moved with a thread of pitch equal to that of the thread to be formed and to arrange this thread for cooperation with a suitable nut whereby relative rotation between the spindle and the nut is effective to move the spindle longitudinally, assuming the nut to be stationarily supported, at a rate of linear progression directly corresponding to the pitch of the thread. Under these conditions a single relative revolution of the spindle with respect to the nut is thus effective to move the spindle longitudinally for a distance equal to the pitch of the thread, that is, if the master thread on the spindle is of ten pitch or ten threads to the inch, a single revolution of the spindle results in moving the latter longitudinally for one-tenth of an inch. This method of moving the spindle is open to the disadvantage that in case the master thread is not entirely perfect, the error transmitted to the spindle is not merely the error in a single convolution of the master thread but the sum of the errors of all the convolutions thereof. For example, if the error in each convolution of the master thread is .001″ and the thread is of ten pitch to the inch, the error in the longitudinal movement of the spindle produced by a single relative revolution between it and the nut will be ten times .001″ or .01″ instead of merely .001″, a condition which is inimical to the production of accurate threads in the work.

In accordance with my invention, however, this difficulty is obviated by providing the spindle with a master thread of greater pitch than the thread to be formed in the work and then effecting the requisite longitudinal movement of the spindle by a partial relative revolution between it and the nut instead of by a complete revolution. Thus, for example, if the master thread be formed with a pitch of one to the inch and it be desired to form a thread of ten pitch to the inch, the requisite longitudinal movement of the spindle may be effected by causing a relative revolution between the nut and the spindle of only one-tenth of a complete turn, so that instead of the sum of all the errors in the master thread being communicated to the spindle but one-tenth of such sum is communicated thereto. The utilization of a master thread of greater pitch than that of the thread to be formed also results in a minimization of error in the latter for the additional reason that, as a practical matter, a master thread of such character, the convolutions or segments of which are ordinarily of relatively great cross sectional area, can be machined more accurately than the finer master threads hitherto employed and is subject to less wear under operative conditions by reason of the greater area of contact between the relatively moving surfaces of the thread on the spindle and in the nut, so that the accuracy of such master threads is ordinarily initially greater and can be preserved for a much longer period of time with corresponding resulting accuracy in the threads formed by the machine.

In accordance with these principles I therefore provide the spindle 25 with an external master thread 110 of greater pitch than the thread which I desire to form on the pipe, for example, a pitch of one thread to the inch when it is desired to form a ten pitch thread. This thread I dispose on the spindle in the rear of the head 72 conveniently enlarging the diameter of the spindle at this point for its reception and thereby providing a small shoulder 111 at the rear end of the thread which is adapted to abut the face of the housing 24 when the spindle is in the position shown in Fig. 8. This thread which may be either single or multiple, is cooperative with a correspondingly internally threaded nut 112 positioned between the adjacent end faces of the housings 130

24 and 74 so as to be incapable of movement in a direction parallel to its axis although free for rotation about the spindle, and integral with this nut or rigidly secured thereto is a gear 113 in meshing engagement with a similar gear 114 keyed to a sleeve 115 journaled for rotation in a web 116 which extends vertically upward from and is integral with the base 20 and with the housing 24. The gear 114 is disposed between the face of the web and the ratchet collar 117 also keyed to the sleeve and provided with peripheral ratchet teeth 117′, while adjacent the collar and pivotally mounted for rotation on the sleeve is a pawl arm 118 provided with a spring pressed pawl 119 adapted for engagement with the ratchet teeth, the free end of the arm extending in a generally downward direction from the sleeve. Upon the opposite side of the web and also keyed to the sleeve is a clutch member 120 having clutch teeth 120′ on its end face adapted for cooperative engagement with similar teeth on the end face of a gear 121, which may be mounted for rotation upon one end of a plunger shaft 122 extended through sleeve 115 and surrounded at its other end by a coil spring 123 maintained in position by nuts 124 in such manner that the spring tends to maintain in mesh the clutch teeth on the gear and on the clutch member. The gear 121 is in meshing engagement with a gear 125 splined to the spindle for sliding movement thereon and rotation therewith in a manner similar to the gear 100, and the face of gear 121 is made of somewhat greater width than the face of gear 125 so that irrespective of whether the clutch teeth are in engagement so that the gear is locked to the clutch member to rotate the latter, or are raised out of engagement with said teeth as when the clutch is being rotated independently of the gear as hereinafter described, gears 121 and 125 will remain constantly in mesh.

The clutch teeth on the clutch member and the gear 121 are so designed that when engaged, as shown in the drawings, gear 125 is effective to drive gear 121 in the direction indicated by the arrow, thus driving nut 112, through sleeve 115, gear 114 and gear 113, in the same direction as that in which the spindle is rotated by gear 100 in the threading operation.

It is, however, important that the speed of rotation of the nut shall bear a certain definite relation to that of the spindle in order that the linear progression of the latter shall bear the proper ratio to the movement of rotation thereof so that for each complete revolution of the spindle, and in turn the work, the work will be moved longitudinally of the cutter for a distance equal to the pitch of the thread to be formed. In other words, assuming a thread of ten pitch to the inch is desired and that the master thread is one pitch to the inch, it is necessary to move the work longitudinally of the cutter for one-tenth of an inch for each revolution of the work, and it is therefore necessary to design the ratio of the gears in the train through which the nut is driven with this end in view. Thus, in the example given, the gear 125 may be provided with 54 teeth, gear 121 with 60 teeth and both gears 114 and 113 with any similar number of teeth such as 57. Under these conditions it will be apparent that for each complete revolution of the spindle the nut will be turned for nine-tenths of a revolution or through an angle of 324°, with the result that the spindle will be moved through the nut for one-tenth of an inch, that is, for one-tenth of the pitch of the master thread. It will of course be understood that other gear ratios may be employed to effect the same result with a master thread of similar pitch and further that with a master thread of different pitch it will ordinarily be necessary to utilize gearing of still other ratios, the ultimate object to be atained in any case being to effect through a partial revolution of the nut for each complete revolution of the spindle, a longitudinal movement of the latter for a distance equal to the pitch of the thread to be cut.

*Spindle returning means.*

Since in the operation of the machine and in the manner just described, the spindle is caused to move toward the right from starting position, as shown in Fig. 8, to final position, substantially as shown in Fig. 9, suitable means for returning the spindle to starting position are provided. While said means may be of any convenient form, it is, however, of extreme importance that they be of a character to effect positive engagement of the shoulder 111 with the face of housing 24 each time that the spindle is returned so as to always bring the spindle to rest in exactly the same position and thus insure that the forward movement of the spindle will be always initiated from exactly the same point for each threading cycle with resulting accuracy and similarity in the threads produced on consecutive pieces of work, irrespective of any slight wear or looseness between the parts of the spindle actuating mechanism.

For attaining this result the means which I prefer to use comprise a link 127 pivoted to the free end of the pawl arm 118 and to one end of a horizontally movable lever 128 pivoted at its other end on a stud 129 carried by the base. This lever may be provided near its pivoted end with an eye 130 in which is arranged a perforated block 131 through which slidably extends a rod 132 surrounded by a coil spring 133 and attached to which is one end of another spring 134 having its other end secured to any suitable point on the base. The position of the lever under the influence of spring 134 is normally such that the end of the ratchet arm extends generally toward the rear of the machine, and from this position the lever may be swung forward by the action of a trigger 135 pivoted near its center to the base, and having one end pivoted to the rod and the other extending over the edge of the abse for actuation by a stop 136 which may be secured to the main pedestal 2, the several parts being so designed that when the table moves to the rear the trigger will slide over the stop without actuating lever 128, but when the table is drawn forward the trigger will engage the stop and swing the lever in a similar direction, thus causing the pawl arm to turn the ratchet collar and in turn the sleeve and gear 114 through a suitable arc.

As the return movement of the table 4 is effected when the power is turned off from the machine (as will hereinafter more fully appear in the description of the operation thereof) the main spindle 25 under these conditions is locked against rotation and gear 121 similarly locked, so that as the pawl arm 118 rotates sleeve 115 in a direction opposite to that in which the clutch teeth are designed to lock the clutch member and gear 121 together, the teeth on the member ride over those on the gear, shaft 122 sliding longitudinally in the sleeve against the resistance of spring 123 for a sufficient distance to permit such relative movement of the teeth but being immediately moved by the spring to a position to again lock the teeth together as soon as the rotation of the sleeve is completed.

It will thus be apparent that rotation of the gear 114 through the movement imparted to the sleeve by the pawl arm is operative to rotate nut 112 in the same direction as that in which it was rotated when the spindle was advancing, and as the nut is prevented from longitudinal movement through its engagement with housings 24 and 74 the result of its rotation is to return the spindle toward its starting position until shoulder 111 contacts with the face of the housing 24 and thus prevents further movement of the spindle in the return direction, during which, of course, the spindle has slid longitudinally through gears 100 and 125.

As it would be practically impossible to design and operate the various parts so that the forward movement of the pawl arm would be arrested simultaneously with the movement of the spindle, I prefer to provide at some point in the linkage through which the pawl arm is actuated, a suitable yielding connection such as is effected in the present instance through the medium of the spring controlled rod 132, so that when the sleeve has been rotated by the pawl arm for a sufficient distance to return the spindle to starting position and further rotation of the sleeve thus prevented, the yielding connection in the linkage can take up any further motion imparted from the trigger 135 without injury to the parts by the rod 132 sliding through the block 131 against the resistance of spring 133 until the trigger passes the stop 136, after which springs 133 and 134 operate to pull the lever 128 rearward and in turn swing the pawl arm in a similar direction to its normal position substantially as shown in Fig. 1, the pawl 119 during this movement merely riding over the ratchet teeth without imparting any movement thereto.

*Main shaft driving means.*

It will have been observed that the main spindle and cam 39 are driven from the main shaft 27, and this shaft in turn may be preferably driven from the roughing cutter shaft and the latter from the main arbor 7 in any convenient manner, as for example, through the medium of a gear 140 mounted on the arbor 7 and which meshes with a floating idler gear 141 in turn meshing with the gear 45 carried by the roughing cutter shaft. The idler gear may be supported in any suitable way and by any suitable means such as a pair of spaced links 143 each pivoted at one end on the main arbor and at the other on a short shaft or stud 144 on which the idler turns and from which another pair of substantially similar links 145 depend and are in turn pivotally mounted at their ends on the stud and on the roughing cutter shaft. Thus when so supported, the idler is always maintained in mesh with both gears 140 and 45 irrespective of the position to which either the roughing cutter shaft or the table 4 may be brought by reason of their respective movements of reciprocation in the operation of the machine, and it will be apparent that rotation of the arbor 7 will be operative to drive the main shaft 27 through the train comprising gears 140, 141, 45, 46, 47, worm 50 and worm gear 51, and further that when the arbor 7 is stationary the drive shaft 27 will be prevented from rotation and, in turn, the main spindle, roughing cutter shaft and cam 39 through the locking action exerted by the several worms and worm gears through which the drive of these several elements is effected. It will be understood, however, that the drive of the main shaft may, if desired, be effected in any other suitable and convenient way, the means employed for this purpose, whatever be their specific construction, being preferably of such character as to maintain the drive shaft stationary when the main arbor is in similar condition as just explained.

Angular disposition of main spindle.

In a tapered thread the radial distance from the axis of the piece to similar points on different thread segments varies in accordance with the taper; thus, the distance, or "radial magnitude" as it may conveniently be termed, from the tops or apices, for example, of two adjacent thread segments to the axis of the piece is slightly different though measured in the same radial plane. It is therefore necessary in milling such threads to provide means for imparting to the cutter or the work, simultaneously with their relative longitudinal and rotative movements, a very gradual and slight movement generally transverse to the axis of the work so as to compensate for this difference in radial magnitude by progressively causing the cutter to take a slightly deeper or lighter cut in accordance with the direction in which the relative longitudinal movement of the cutter and the work is effected, as in the absence of such transverse movement the cutter, upon completion of a single complete circuit of the surface of the work, would thereafter either cut into the threads already formed or else not be effective to cut a full thread on the ensuing circuit. This compensation I prefer to effect by inclining the longitudinal axis of the spindle so as to parallel the taper of the threading cutter instead of mounting the spindle on the base 20 with its axis parallel to the axis of the arbor 7, but since, under ordinary conditions, such angular disposition of the spindle is very slight, no attempt has been made to indicate the same in the figures illustrating the construction of the machine, as to do so would be impracticable. In Fig. 12, however, I have diagrammatically illustrated the preferred manner of disposing the spindle for the cutting of tapered threads and reference may be had thereto for a better understanding thereof. In this figure the threading cutter T is shown with a greatly exaggerated taper and the pipe P is shown as it would appear after being traversed by the threading cutter, assuming the same were not provided with teeth. The axis of the spindle is designated by the broken line A—B which, it will be noted, is parallel to the line of contact between the cutter and the pipe while the axis X—X of the arbor 7 on which the cutter is mounted and the axis of the pipe Y—Y are parallel. When the parts are arranged in this manner in an operative machine, it will be apparent that as the spindle progressively advances or moves to the right (Fig. 12) the end of the pipe will be gradually raised toward the cutter so that no matter how far the movement of the spindle is carried, the proper relation between the cutter and the pipe for the production of a perfect thread will always be maintained. Such, however, would not be the case if the axes of the spindle and cutter were parallel, for under such conditions as the spindle advanced the pipe would gradually recede from the cutter and thereby prevent the latter from cutting to the required depth. Obviously, the desired result could be attained with equal facility in a machine designed so that the pipe is moved longitudinally to the left during the cutting operation, in which case, of course, the inclination of the spindle would result in a gradual lowering of the end of the pipe with respect to the cutter.

It will be apparent, however, as the pipe and the spindle respectively rotate about relatively inclined axes, it is requisite, in order to maintain the pipe in proper contact with the cutter, to provide for a slight universal movement between the spindle and the pipe, which result is conveniently obtained by the means hitherto described whereby the pipe is secured in operatively fixed relation with the ball 76 which in turn is capable of slight universal movement with respect to the spindle.

Operation.

In forming a tapered thread upon a pipe or other hollow, substantially cylindrical article in accordance with the method claimed in my said application Serial No. 685,545 and by means of a machine of the general character of that hereinbefore described, the machine is initially so adjusted as to bring the table to the forward end of its path and the threading and roughing cutters into the same vertical plane but not into vertical alignment, the roughing cutter being disposed below and considerably in the rear of the threading cutter and the cam 39 being in a position in which the roughing cutter supporting block is retracted toward the rear of the machine. The chuck for holding the pipe having been inserted into and clamped in the end thereof in such manner that the nose of the member 88 extends for a suitable distance beyond the end of the pipe, the latter, with its opposite end supported on a suitable track or in any other convenient way so that the pipe can be freely rotated, is brought to the machine and disposed in a substantially horizontal position with the nose of member 88 against the centering point of the center 81, pins 92 being held in retracted position by suitable disposition of the collar 93. The latter is then rotated so as to force the pins into the groove 91 and draw the chuck firmly against the center and lock it thereto, the dog 98 meanwhile having entered between two of the adjacent lugs 99 on the end of the carrier of the chuck, thus placing the several parts of the machine and the pipe in substantially the positions shown in Figs. 1 and 2 with spindle 25 retracted with shoulder 111 snugly seated against the adjacent face of the housing 24 and both cutters out of contact with the pipe. The table 4 having been adjusted to bring the pipe to the proper height with respect to the threading cutter and the roughing cutter set so that it will cut into the pipe for the desired depth, power is supplied to the machine, thereby causing rotation of both the arbor 7 carrying the threading cutter and the main shaft 27 with resulting rotation of cam 39, roughing cutter, spindle 25 (with corresponding rotation of the pipe) and nut 112, the movement of the latter being effective through the train comprising gears 124, 119, 114 and 113 to rotate the nut 112. Cam 39 is so designed as to quickly move the roughing cutter supporting block forward, thus carrying the roughing cutter into the rotating pipe for the maximum depth of the roughing cut, and to thereafter hold the roughing cutter supporting block in such advanced position, so that after the initial forward movement of the block is effected and the cutter brought to depth, the distance between the axis of the cutter and the axis of rotation of the pipe remains constant until the entire surface of the pipe has passed beneath the cutter, when the cam operates to retract the block and the cutter to initial or starting position. Preferably, the roughing cutter and the pipe are arranged to revolve in the same direction which is such that as the pipe rotates the point at which the roughing cut was commenced gradually moves upward so as to approach the threading cutter. Meanwhile, rotation of cam 39 has brought dog 63 into contact with finger 64, thus urging the trip rod 29 forward to engage and actuate finger 14 and cause the latter to throw the automatic feed of the table 4 into operation, thereby causing the table with its attached mechanism to move rearward so as to carry the continuously rotating pipe toward the threading cutter. As the pipe is gradually carried against the cutter in the manner described, the latter finally attains the requisite depth of cut to form the threads and I prefer to so adjust the machine that this condition will be brought about when the axes of the pipe and cutter are in substantial vertical alignment. Furthermore, the several relative movements of the cutters and the pipe to which I have just referred are so timed with respect to each other, and the relative positions of the cutters and pipe are such, that the pipe is caused to rotate through an angle of substantially 90° following the commencement of the roughing cut before the threading cutter reaches its maximum depth, with the result that this cutter commences and continues its operation throughout the threading cycle on a surface from which the scale has been removed, which has been tapered in accordance with the taper of the thread to be formed, and which has been brought to truly circular cross sectional contour by the action of the roughing cutter, so that the threading cutter is relieved from any duty other than that of cutting the threads in the clean metal which has been exposed by the roughing cut.

As soon as the table 4 has been moved rearward by the automatic feed for a sufficient distance to bring the threading cutter into depth, a condition which, as stated, will preferably be brought about when the axes of the pipe and of the cutter are in substantial vertical alignment, a suitable stop 150, operatively fixed with respect to the table, actuates the trip 14 so as to disengage the feed and arrest further rearward movement of the table, which subsequently remains at rest until the pipe has completed a little more than a full revolution with respect to the threading cutter so that the latter is accorded an opportunity to operate on the entire surface to be threaded. Theoretically, a single complete revolution of the pipe with respect to this cutter would be effective for this result, but in practice it is desirable to give the pipe slightly more than a full revolution with respect thereto in order to prevent any unevenness or inequalities in the thread segments at the points of juncture between those portions formed by the initial operation of the cutter and those formed by the final operation, and, in practice, revolution of the pipe through an arc of 5° to 10° will ordinarily be sufficient for this purpose.

Additionally, since the pipe begins to revolve and the roughing cutter commences its cut considerably in advance of the time when the threading cutter is brought to depth at a point already traversed by the former cutter, it is requisite, in order to permit the action of the threading cutter on the entire surface to be threaded, to impart to the pipe sufficient additional rotation beyond that actually required for the operation of the threading cutter to compensate for the time that the threading cutter was inoperative after the revolution of the pipe began, and as the angle between lines drawn to the center of the pipe from the centers of both cutters when the latter are in to depth is preferably substantially 90°, the required additional rotation is substantially similar in amount. Thus, to enable both cutters to properly perform their respective functions, it is requisite to revolve the pipe, after the roughing cutter has been brought to depth, for a complete revolution of 360°, plus 90°, plus the slight amount desirable for insuring perfect joining of the thread segments, or approximately 455° to 460° in all, and it will thus be apparent that during the total revolution of the pipe the threading cutter will not be completely operative during approximately the first quarter revolution of the pipe and that the roughing cutter will be inoperative during approximately the final quarter revolution thereof.

At the initiation of the threading cycle the spindle 25 is positioned with the shoulder 111 abutting the face of the housing 24 and during the cycle is progressively advanced from such position through coaction of nut 112 with the master thread on the spindle so as to correspondingly move the pipe longitudinally toward the left when viewed as in Fig. 2, and as the longitudinal progression of the pipe for each complete revolution is, as previously explained, equal to the pitch of the thread to be formed, the threading cutter, instead of merely forming a plurality of adjacent grooves in the pipe in planes normal to its axis, is effective to produce on the pipe in a single complete revolution thereof with respect to the cutter, a continous spiral thread of a taper corresponding to that of the cutter and of a length determined by the effective length of the cutter. It will be observed that as, following the completion of each threading operation, the return mechanism for the spindle is effective to snugly seat the shoulder 111 against the housing 24, any lost motion between the master thread and the nut, or at other points of the mechanism, is taken up before the spindle starts to rotate and move from starting position in the ensuing cycle so that before the cutters come into action on the pipe the various parts and particularly the master thread and the nut are snugly brought together and coordinated for accurate operation, and further that as each time the spindle is returned to exactly the same starting position, the threading operation is commenced each time at the same point on consecutive pieces of work.

It will be further observed that by reason of the slightly angular disposition of the axis of the spindle with respect to the axis of the threading cutter, the pipe as it is rotated and moved longitudinally is simultaneously gradually moved toward the axis of the cutter as the spindle advances, thus compensating for the differences in radial magnitude of the thread segments of the tapered thread which is being formed and preserving at all times during the cutting operating the proper relative positions of the cutter and of the work necessary for the production of a perfect thread of that character. It will be understood, however, that if the machine is designed for cutting straight threads instead of tapered threads such compensation is not required as the radial magnitude of all of the thread segments in the straight thread is the same, and therefore a machine intended for such purpose would ordinarily be so constructed so that the axes of the spindle and of the threading cutter are parallel in which case the longitudinal and rotative movements of the spindle during the threading operation will result solely in corresponding movements of the pipe.

Upon the completion of the several operations to which reference has been made and the pipe having thus been completely threaded, the power is thrown off of the machine so that all parts will be brought to rest with the table 4 at the extremity of its rearward movement. The collar 93 is then loosened and the pipe, carrying the chuck, withdrawn from the machine, the spindle of course remaining in its advanced position. The operator, by means of the hand wheel 13 or other means provided, then operates the quick return feed so as to move the table forward to its initial or starting position during which movement the trigger 135 engages the stop 136 so as to swing the lever 128 forward about its pivot substantially to the position shown in Fig. 11 which is effective to cause the pawl 119 to rotate the ratchet collar 117 and, in turn, to rotate the gears 114 and 113 with consequent rotation of the nut 112 in the same direction as that in which it was driven while the pipe was being threaded. Since the main arbor 7 is now stationary, the main drive shaft 27 is also stationary and the gear 100 prevented from rotation, so that as the master nut is turned (and being, as it is, incapable of longitudinal movement between the housings 24 and 74) the spindle, sliding through the gears 124 and 100, is retracted until the shoulder 111 contacts with the face of the housing 24, thus arresting further movement of the spindle.

As it is desirable to insure the complete and positive return of the spindle to initial position each time that the mechanism functions, the throw of the trigger 135 is preferably so calculated as to move lever 128 forward in excess of the distance necessary to turn nut 112 the required amount to return the spindle, and the parts so arranged through the medium of the yielding connection between the lever and link that when the lever has moved forward enough to bring shoulder 111 against the housing 24, the rod 132 thereafter merely slides through the block against the resistance of spring 133 until the point of the trigger clears stop 136 when springs 133 and 134 immediately respectively expand and contract so as to again move the lever rearward and cause the pawl to ride over the teeth of the ratchet to assume its normal position as in Figs. 1 and 3, as hitherto explained.

The length of the arc through which the nut 112 must turn to return the spindle to starting position of course will vary with the pitch of the master thread and the longitudinal distance through which the spindle is moved during the threading cycle, but generally speaking the nut will, for this purpose, be turned through an arc approximately equal to the difference between 360° and the degrees of arc through which it has been turned for each revolution of the spindle, multiplied by the total number of complete revolutions and fractions thereof which have been made by the spindle in its forward progression. Or, in other words, if for each revolution of the spindle, the nut has been turned for nine-tenths of a revolution as the spindle has moved forward, the return of the spindle can be accomplished by moving the nut in the same direction one-tenth of the total number of degrees through which the spindle has turned; thus, for example, using a master screw of one pitch to the inch and cutting a ten pitch thread on the pipe in a machine such as herein described, it is necessary for returning the spindle to rotate the nut substantially one-tenth of 455° to 460° if that be the total number of degrees through which the spindle is turned during its forward movement. However, in practical operation, the exact calculation of the arc through which the nut must be turned is not required provided the means employed therefor are so designed and adjusted, preferably in the manner herein described, as to turn the nut for at least the required amount and thereafter absorb any excess motion of the parts without injury thereto.

After the table, by means of the quick return feed, has been brought to starting position and the spindle also returned to such position, the machine is once more in condition for operation on another piece of pipe, cam 39 having already moved the roughing cutter supporting block and roughing cutter rearward to starting position, preferably immediately after the roughing cutter has completed its work upon the pipe and before the completion of the work of the threading cutter thereon.

While I have illustrated in the accompanying drawings and have herein described with considerable particularity one form of machine embodying a work-holding spindle and means for effecting longitudinal progression and retraction in accordance with the present invention, it is to be understood that the use of the present invention is in no way confined to a machine of that general character, the invention being readily adaptable to other forms of machines and for use under different operative conditions and with different classes of work, and further that the details of design, construction and arrangement of the various parts and elements employed in the provision of a mechanism operable in accordance with the improved method herein claimed may be varied materially from the precise embodiments herein disclosed, without departing from the spirit and scope of the invention as defined in the appended claims.

Having thus described my invention, I claim and desire to protect by Letters Patent of the United States:

1. A machine of the class described comprising a cutter rotatable on a fixed axis, a table movable with respect to the cutter, means for moving the table, a rotatable spindle supported from the table and movable therewith, means for rotating the spindle, means for causing longitudinal movement of the spindle with respect to the cutter including a thread carried by the spindle and a nut cooperative with the thread, means for preventing movement of the nut in a direction parallel to the axis of the spindle, means for causing a partial revolution of the nut on the spindle simultaneously with each complete revolution of the spindle, and means distinct from said last mentioned means for rotating the nut relatively to the spindle when the spindle is stationary.

2. A machine of the class edscribed comprising a threading cutter, a table movable with respect to the cutter, means for moving the table, a work holding rotatable spindle supported from the table and movable therewith, means including a worm and worm gear for rotating the spindle, said worm and worm gear being operative by mutual coaction to lock the spindle against rotation when said rotating means are stationary, means for causing longitudinal movement of the spindle with respect to the cutter and comprising a thread carried by the spindle and a nut cooperative with the thread, means for rotating the nut when the spindle is rotating, and means distinct from said last mentioned means for causing a partial revolution of the nut relatively to the spindle when said spindle is held locked against rotation.

3. A machine of the class described, comprising a cutter rotatable in a fixed position, a table movable with respect to the cutter, a spindle journaled for rotation above the table, means including a worm and worm gear operative to rotate the spindle in a predetermined direction and to lock the spindle against rotation by interaction of said worm and worm gear when said means are stationary, a thread carried by the spindle, a nut cooperative with the thread, means for constraining the nut to rotate in a fixed position, means for rotating the nut in the same direction as the spindle while the latter is being rotated, and means for rotating the nut in the same direction while the spindle is locked.

4. A machine of the class described comprising a cutter rotatable in a fixed position, a table movable with respect to the cutter, a work holding spindle journaled for rotation above the table, means for rotating the spindle in a predetermined direction including a worm and worm gear operative through mutual engagement to lock the spindle against rotation when said means are stationary, a thread carried by the spindle, a nut cooperative with the thread and constrained to rotate in a fixed position, means for effecting a partial revolution of the nut for each complete revolution of the spindle and in the same direction so as to effect a longitudinal advance of the spindle in a predetermined amount simultaneously with each revolution thereof, and means for imparting to the nut a further partial revolution when the spindle is locked against rotation to thereby return the spindle to its initial position.

5. A machine as specified in claim 4 and embodying a fixed stop adapted to limit the return movement of the spindle and including an overrunning clutch in the spindle returning means.

6. A machine as specified in claim 4 and embodying a fixed stop and a shoulder on the spindle adapted to engage the stop and limit the return movement of the spindle, said spindle returning means being arranged to positively move said shoulder into engagement with said stop upon each return movement of the spindle.

7. The method of effecting a longitudinal progression of the work-holding spindle of a milling machine for an amount for each revolution of the spindle equal to the pitch of the thread to be milled, which consists in imparting to the spindle, provided with a lead thread of one-tenth the pitch of the thread to be milled, a single complete revolution in a given direction and simultaneously imparting to a nut cooperative with said thread a movement of revolution in the same direction through an arc of substantially 324° while restraining the nut from endwise movement.

8. In mechanism, a rotatable spindle, means for rotating the spindle, a thread on the spindle, a nut cooperative with the thread, means for preventing longitudinal movement of the nut, means for rotating the nut in the same direction that the spindle is rotated but at a slower rate, whereby when the spindle and the nut are both rotated the spindle will be advanced longitudinally through the nut, means forming a component part of the spindle rotating means operative to lock the spindle against rotation when it has accomplished a desired longitudinal advance, means for imparting additional rotation to the nut while the spindle is locked whereby the spindle is retracted longitudinally and means limiting the extent to which the spindle can be retracted.

9. In mechanism, a rotatable spindle, means for rotating the spindle, a thread on the spindle, a nut cooperative with the thread, means for preventing longitudinal movement of the nut, means for rotating the nut in the same direction that the spindle is rotated but at a slower rate, whereby when the spindle and the nut are both rotated the spindle will be advanced longitudinally through the nut, means forming a component part of the spindle rotating means operative to lock the spindle against rotation when it has accomplished a desired longitudinal advance, means for imparting additional rotation to the nut while the spindle is locked whereby the spindle is retracted longitudinally and means for arresting consecutive retractive movements of the spindle at the same point 10. The method of effecting longitudinal progression and retraction of a threaded spindle, which comprises effecting rotation of the spindle within a threaded nut, simultaneously effecting rotation of the nut in the same direction as the spindle but at a slower rate while restraining the nut against longitudinal movement whereby the spindle is caused to advance through the nut, locking the spindle against rotation when it has attained a predetermined advanced position and then rotating the nut for an additional amount in the same direction to thereby cause the spindle to be retracted to a predetermined position.

In witness whereof I have hereunto set my hand this 24th day of November A. D., 1924.

GEORGE E. MIRFIELD.